United States Patent [19]
Nanbu

[11] Patent Number: 5,556,047
[45] Date of Patent: * Sep. 17, 1996

[54] MOTOR OPERATED FISHING REEL

[75] Inventor: Kazuya Nanbu, Tokyo, Japan

[73] Assignee: Daiwa Seiko, Inc., Tokyo, Japan

[ * ] Notice: The term of this patent shall not extend beyond the expiration date of Pat. No. 5,397,071.

[21] Appl. No.: 314,276

[22] Filed: Sep. 30, 1994

Related U.S. Application Data

[63] Continuation of Ser. No. 96,415, Jul. 26, 1993, Pat. No. 5,397,071.

[51] Int. Cl.$^6$ .................................................. A01K 89/017
[52] U.S. Cl. ........................................................ 242/250
[58] Field of Search ............................ 242/250, 225, 242/261, 223

[56] References Cited

U.S. PATENT DOCUMENTS

| | | | |
|---|---|---|---|
| 3,017,134 | 1/1962 | Duvall | 242/250 |
| 3,116,892 | 1/1964 | Pickard | 242/250 |
| 4,021,003 | 5/1977 | Watkins | 242/250 |
| 4,283,025 | 8/1981 | Whisenhunt | 242/250 |
| 4,585,182 | 4/1986 | Atobe | 242/223 |
| 4,697,758 | 10/1987 | Hirose | 242/223 |
| 4,784,346 | 11/1988 | Steffan | 242/250 |
| 4,832,277 | 5/1989 | Ohtake | 242/250 |
| 5,397,071 | 3/1995 | Nanbu | 242/250 |

FOREIGN PATENT DOCUMENTS 3-119941  5/1991  Japan.

*Primary Examiner*—Katherine Matecki
*Attorney, Agent, or Firm*—Longacre & White

[57] ABSTRACT

A motor output regulator for increasing and decreasing the output of a spool drive motor in multiple continuous stages is rotatably provided, in a motor-operated fishing reel equipped with a spool drive motor, on the same side of the reel body where a manual handle for manually driving the spool to rotate is installed. The direction in which the output of the motor is increased by the motor output regulator is set equal to the direction in which the fishline is wound up onto the spool by the manual handle. The motor-operated fishing reel is excellent in operability in that while both sides of the reel body is gripped, the output of the motor can be made variable to adjust its speed. It is also possible to simultaneously perform both winding-up operation by the manual handle and speed change operation by the motor output regulator with a single hand.

8 Claims, 4 Drawing Sheets

5,556,047

MOTOR OPERATED FISHING REEL

This is a continuation of application Ser. No 08/096,415, filed Jul. 26, 1993, now U.S. Pat. No. 5,397,071, issued Mar. 14, 1995.

BACKGROUND OF THE INVENTION

The present invention relates to improvements in motor-operated fishing reels in which the output of a spool drive motor can be adjusted.

Recent Japanese Patent Laid-Open No. 119941/1991 discloses a motor-operated fishing reel in which the output of a spool drive motor is varied so as to set variable the speed of winding up a fishing line by three of high, intermediate and low stages.

The aforesaid motor-operated fishing reel which is provided with, as shown in FIG. 7, a transmission slide switch a for selectively switching the speed of the spool drive motor by three of high, intermediate and low stages on an operating panel c on the surface of a reel body b. The slide switch a is slidable in the longitudinal direction so that the speed of the spool drive motor can be varied by the three stages.

In FIG. 7, d denotes a spool and e a manual handle for driving the spool d to rotate.

In consequence, an angler using the aforesaid motor-operated fishing reel is assumed to perform the operations including rotating the manual handle e with his right hand to wind up the fishing line or operating the slide switch a to vary the speed of the spool drive motor while gripping the left-hand side of the reel body b with his left hand, and gripping the right-hand side of the reel body b.

More specifically, the slide switch a is installed on the surface of the reel body b in the motor-operated fishing reel and is to be slid in the longitudinally direction. Therefore, it is hard for the angler to vary the speed of the motor while gripping the reel body b; the drawback is that the angular will have to move his right hand to operate the slide switch a.

In addition, the operability of the motor-operated fishing reel has been considered inferior and impractical because the operation of winding up the fishing line by means of the manual handle e is incompatible with that of varying the speed of the motor.

SUMMARY OF THE INVENTION

An object of the present invention made to solve the foregoing problems is to provide a motor-operated fishing reel excellent in operability in that it allows an angler to vary the output of a motor while gripping one side of a reel body and when a manual handle is fitted thereto, the angler is allowed to perform the operation of winding up a fishing line by means of the manual handle simultaneously with that of varying the speed of the motor.

In order to accomplish the object above, the invention a motor-operated fishing reel which comprises a spool rotatably supported with a reel body and a motor for driving the spool to rotate, and is characterized in that a motor output regulator for increasing and decreasing the output of the motor for driving the spool in multiple stages is installed on one side of the reel body.

A manual handle for driving the spool to rotate is preferably installed on the same side of the reel body where the motor output regulator is installed. The direction in which the output of the motor is increased by the motor output regulator is set equal to the direction in which the fishline is wound up onto the spool by the manual handle.

According to the present invention, the output of the spool drive motor is increased and decreased from 0% to 100% in proportion to the amount of adjustment upon the motor output regulator while the both sides of the reel body are gripped rigidly by both hands, whereby the speed of winding up the fishing line on the spool can be varied.

According to the present invention, the fishing line can be wound up on the spool by turning the manual handle in the winding direction simultaneously with increasing the output of the motor by means of the motor output regulator, though the fishing line is wound up on the spool by turning the manual handle in the winding direction without using the motor output regulator.

DETAILED DESCRIPTION OF THE PREFERRED EMBODIMENTS

Referring to the accompanying drawings, a detailed description will subsequently be described.

Figure 1:
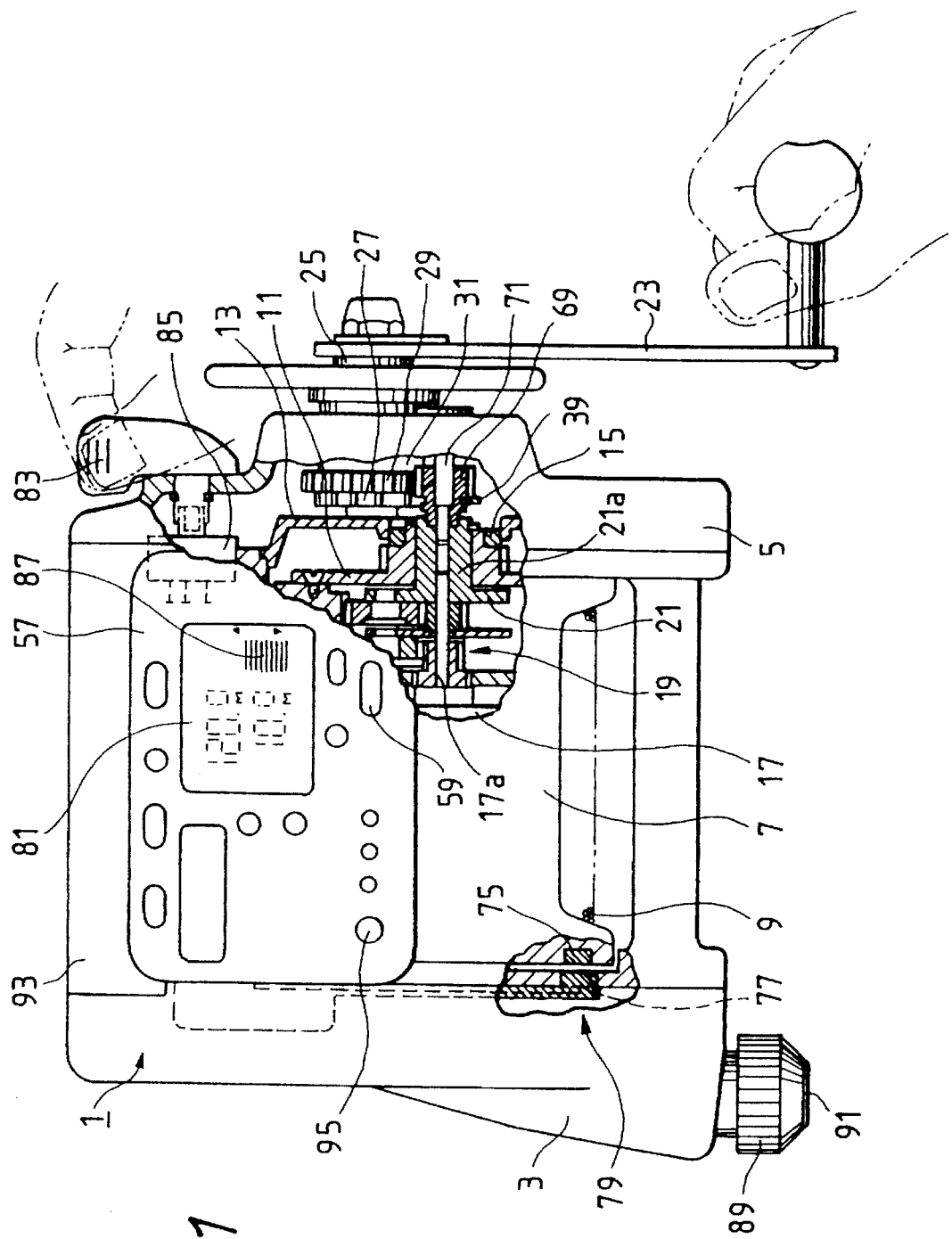
FIG. 1 is a partial cutaway top view of a motor-operated fishing reel embodying the present invention.

FIG. 1 is a partial cutaway top view of a motor-operated fishing reel embodying the present invention. In FIG. 1, numeral 1 denotes a reel body, 3, 5 side plates secured to the respective left- and right-hand sides of the reel body 1, and 7 a spool with a fishing line 9 wound thereon. One end of the spool 7 is rotatably support with the reel body 1 via a bracket (not shown), whereas the other end thereof is supported with a bracket 11 and a bearing 15 of a set plate 13 affixed to the reel body 1.

A spool drive motor (hereinafter called "spool motor") 17 is disposed in the spool 7, the former and the latter being coaxial. The rotary shaft 17a of the spool motor 17 and the spool 7 are coupled together via a reduction gear mechanism 19 so that the torque of the spool drive motor 17 can be transmitted to the spool 7. In this case, the boss 21a of a gear carrier 21 forming the reduction gear mechanism 19 is relatively rotatably fitted into the bracket 11.

Figure 2:
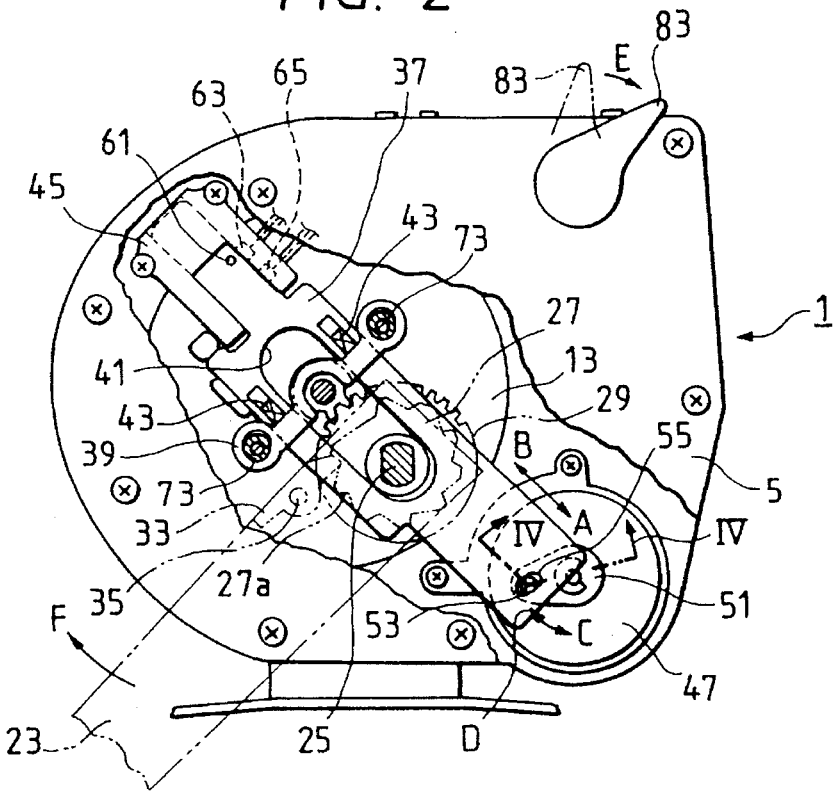
FIG. 2 is a side view of an on-state clutch mechanism in the motor-operated fishing reel of FIG. 1.

Numeral 23 denotes a manual handle 23, which is coupled to one end of a handle shaft 25 projected from a side plate 5, the handle shaft being rotatably fitted to a set plate 13. A ratchet wheel 27 for preventing the spool 7 from reversing is secured into the side plate 5 and a drive gear 29 is rotatably fitted thereto as shown in FIG. 2. The drive gear 29 and the handle shaft 25 are frictionally combined by a drag device 31 set on the handle shaft 25 so that the torque of the manual handle 23 can be transmitted to the drive gear 29. As shown in FIG. 2, moreover, a mating pawl 33 biased by a spring (not shown) is made to abut against the pawl 27a of the ratchet wheel 27 and the mating tooth 33 is pivotally fitted by a pin 35 to the side plate 5.

FIG. 2 is a side view of a clutch mechanism, wherein numeral 37 denotes a clutch operating plate for operating a clutch plate 39 as will be described later. The clutch operating plate 37 longitudinally extends from the upper rear side up to the lower front side of the reel body 1. Further, a slit 41 for letting the handle shaft 25 pass therethrough is formed in the central portion of the clutch operating plate 37. Numeral 45 in FIG. 2 denotes a guide member of the clutch operating plate 37.

Figure 3:
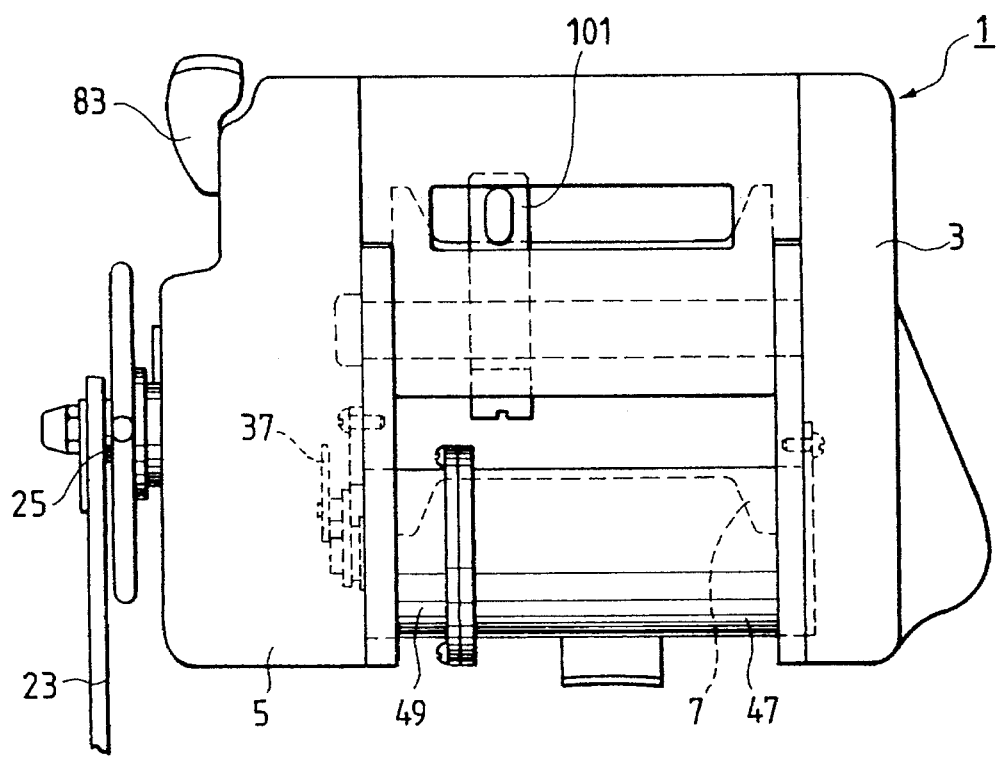
FIG. 3 is an elevational view of the motor-operated fishing reel of FIG. 1.

As shown in FIGS. 2 and 3, a clutch operating motor (hereinafter called "clutch motor") 47 is incorporated in the lower front side of the reel body 1 and used for driving the clutch operating plate 37 to move in directions of arrows A, B. The clutch is thus turned on/off.

Figure 4:
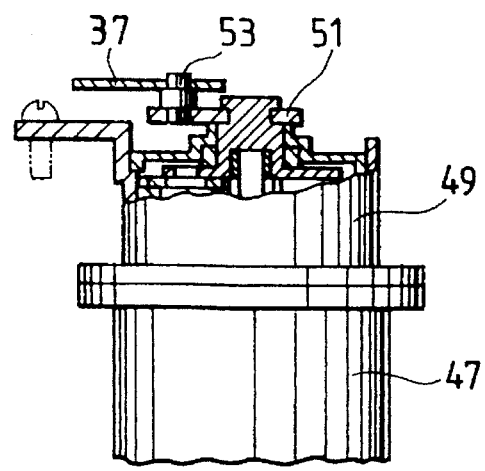
FIG. 4 is a sectional view taken on line IV—IV of FIG. 2.

More specifically, the clutch motor 47 is furnished with a reducer 49 as shown in FIG. 4 and a pin 53 fitted to the lever 51 of the reducer 49 is fitted into a slit 55 provided on the rear end side of the clutch operating plate 37. The clutch motor 47 is driven by the operation of a motor drive switch 59 disposed on an operating panel 57 of FIG. 1. When the clutch motor 47 is rotated by the operation of the motor drive switch 59 to turn the lever 51 in direction of arrow C, the clutch operating plate 37 is moved in direction of arrow A as shown by a solid line to turn off the clutch.

Moreover, a magnet 61 is fitted onto one upper side edge of the clutch operating plate 37 and lead switches 63, 65 which are turned on/off by the magnet 61 are disposed on the guide member 45 so as to correspond to the on/off state of the clutch.

When the clutch motor 47 is rotated by the operation of the motor drive switch 59 in direction of arrow D to cause the clutch operating plate 37 to move in direction of arrow B as shown in FIG. 2, the clutch is turned on and the lead switch 63 is also turned on by the magnet 61. Then a controller 67 instructs the clutch motor 47 to stop operating upon reception of a signal notifying the actuation of the lead switch 63. When the clutch motor 47 moves in direction of arrow C to send back the clutch operating plate 37 up to the position shown by a solid line of FIG. 5, thus turning off the clutch, the lead switch 65 is turned on by the magnet 61 and the controller 67 instructs the clutch motor 47 to stop operating accordingly.

In FIG. 1, on the other hand, numeral 69 denotes a pinion gear which meshes with the drive gear 29 and is rotatably and axially movably supported with a pinion shaft 71 laterally held between the center of the boss 21a of the gear carry 21 and the side plate 5 on the axial line of the spool 7, and a clutch plate 39 is installed between the pinion gear 69 and the boss 21a of the opposed gear carry 21 and used to join and separate them.

The clutch plate 39 is used to transmit or not to transmit to the spool 7 the winding power deriving from the spool motor 17 and remains biased by a coil spring 73 toward the clutch operating plate 37 as shown in FIG. 2. When the clutch operating plate 37 moves in directions of arrows A, B as the clutch motor 47 rotates accordingly, the pinion gear 69 moves in the axial direction of the pinion shaft 71 through the action of the clutch plate 39 so as to allow or prohibit the transmission of the winding power from the spool motor 17 to the spool 7.

In FIG. 1 again, numeral 75 denotes a magnet which is embedded in the side of the spool 7, and 77 a lead switch arranged opposite to the magnet 75. The magnet 75 and the lead switch 77 constitute an encoder 79 for generating a pulse proportional to the rotational speed of the spool 7 by converting the rotation of the spool 7 into an electric signal. The pulse signals are fed to the control 67 where they are computed and the results of computation are displayed in the form of an amount of letting out or winding up the fishing line 9 on a digital display unit 81 on the operating panel 57.

The motor-operated fishing reel according to the present embodiment includes, as shown in FIG. 1, an adjusting lever 83 as a motor output regulator for making variable the rotational speed of the spool motor 17, the adjusting lever being installed rotatably in the range of about 120° on the right-hand forepart side of the reel body 1 equipped with the manual handle 23. The adjusting lever 83 is provided so that, as shown in FIG. 2, the direction in which the output of the motor is increased (in direction of arrow E of FIG. 2) is set equal to the direction in which the reel is wound up by the manual handle 23 (in direction of arrow F of FIG. 2). The right-hand forepart side of the reel body 1 is formed with a recessed portion which receives the adjusting lever 83 to minimize on reel size and to avoid interference between the adjusting lever 83 and the manual handle 23.

Further, the adjusting lever 83 is coupled to a built-in rotary type potentiometer of the reel body 1.

As is well known, the potentiometer 85 is designed to take out voltage corresponding to the position of a brush by moving and sliding the brush on a fixed resistor at a given mechanical displacement so as to vary the resistance value.

Figure 6:
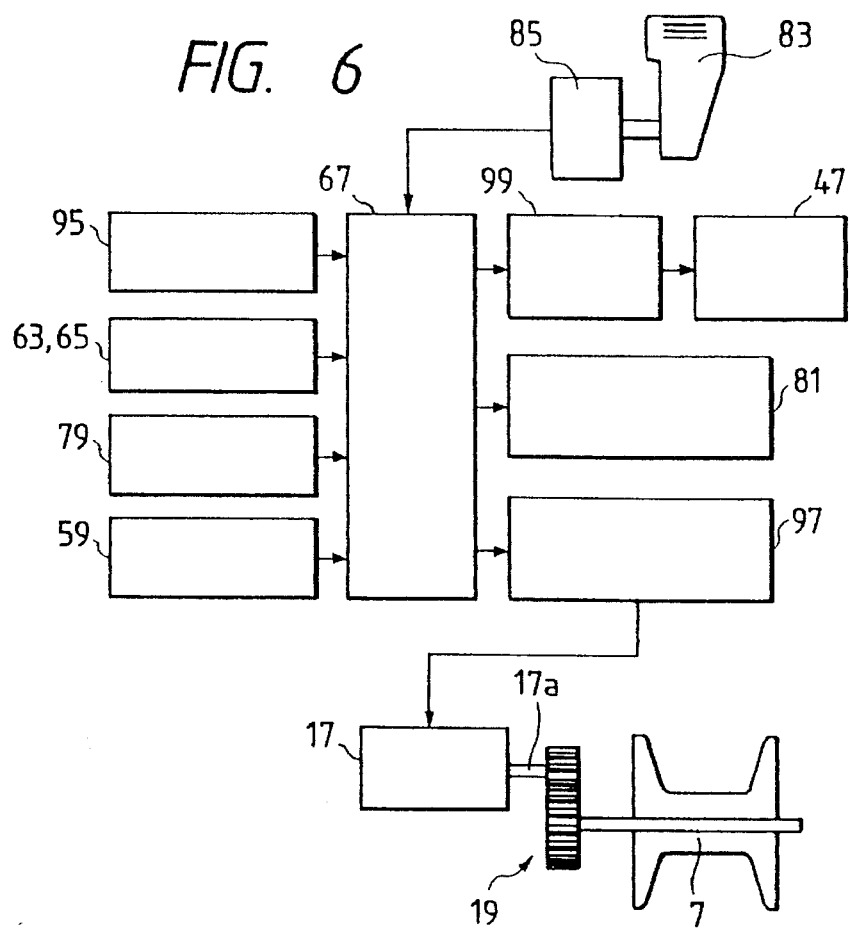
FIG. 6 is a schematic diagram illustrating control means in the motor-operated fishing reel of FIG. 1.

According to the present invention, the adjusting lever 83 is therefore coupled to the potentiometer 85 and operated so as to vary the position of the brush in the potentiometer 85. Then variations of resistance of the potentiometer 85 resulting from turning the adjusting lever 83 as shown in FIG. 6 are fed to the controller 67, which variably controls the time rate of supplying the driving source power to the spool motor 17 as a duty ratio of the pulse signal corresponding to the working degree (the quantity of displacement) of the adjusting lever 83, so that the rotation of the spool motor 17 is made controllable in continuous multiple stages ranging from zero up to the maximum value (0~100%).

Further, the digital display unit 81 is provided with a display 87 for indicating the output of the motor resulting from turning the adjusting lever 83 and bars on quantity graduations of the display 87 change from "0" to "100" successively as the output of the motor is adjusted.

The spool motor 17 and the controller 67 of the motor-operated fishing reel according to the present embodiment are started by connecting a power supply cord 91 of an external battery via a connector 89 to the reel body 1 as shown in FIG. 1. However, it has been so arranged that the spool motor 17 is not driven unless the adjusting lever 83 is returned to the motor output position of 0% once to ensure safety operation.

The controller 67 is housed in a control unit, which is installed in a watertight housing 93 integrally built with the side plates 3, 5 and combined with the reel body 1 as shown in FIG. 1.

As shown in FIG. 6, the motor drive switch 59, the lead switches 63, 65, the encoder 79, the potentiometer 85 and other parts including a main switch 95 disposed on the operating panel 57 and used to deal with the motor-operated fishing reel are connected to the input side of the control 67, whereas the digital display unit 81 and drive circuits 97, 99 for the respective motors 17, 47 are connected the output side thereof. Numeral 101 in FIG. 3 denotes a known level winder mechanism.

With the arrangement above according to the present embodiment, the power supply cord 91 is first connected via the connector 89 to the reel body 1 and then the main switch 95 is operated so as to start the spool motor 17, the clutch motor 47, the control 67 and so on before fishing is started.

Figure 5:
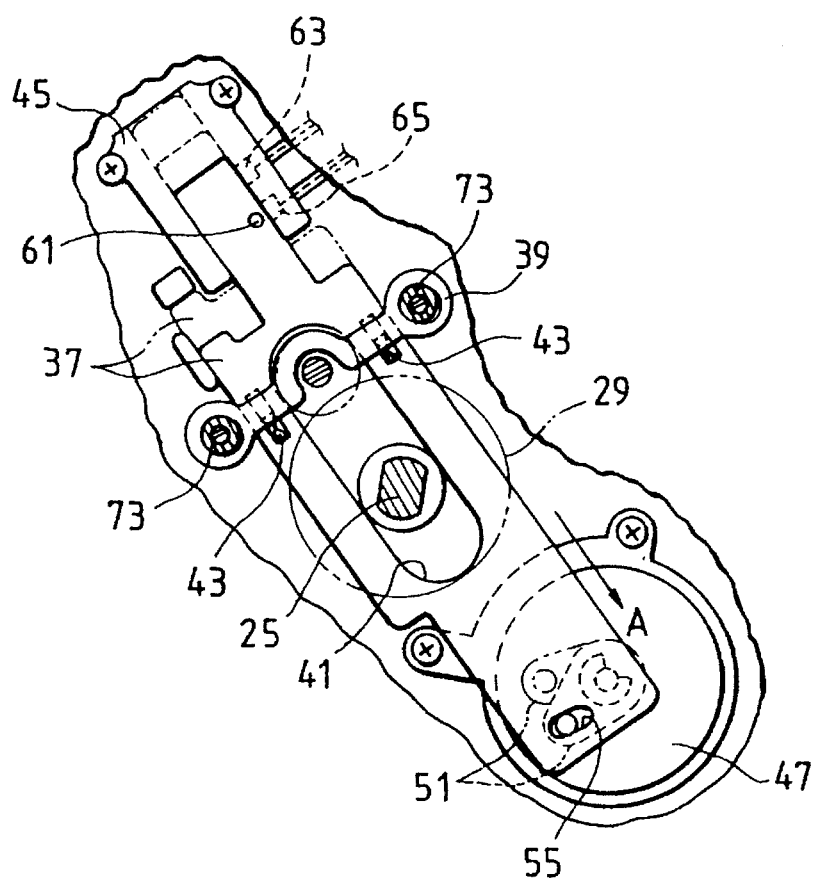
FIG. 5 is a side view of an off-state clutch mechanism in the motor-operated fishing reel of FIG. 1.

When the motor drive switch 59 is push-actuated while the clutch is held ON as shown in FIG. 2, the clutch motor 47 25 moves in direction of arrow C and the clutch operating plate 37 also moves to the position shown by a solid line to turn off the clutch as shown in FIG. 5. Then the lead switch 65 is turned on by the magnet 61 and the controller 67 instructs the clutch motor 47 to stop operating on receiving a signal notifying the actuation of the lead switch 65.

Since the spool 7 is set free when the clutch is turned off, the weight of a catch lets the fishing line 9 out of the spool 7 and the rotation of the spool 7 is converted by the encoder 79 into a pulse corresponding to the length of the fishing line 9 thus sent out. The pulses are fed to and computed by the controller 67 and the length of the extended fishing line based on the results of computation is displayed on the display unit 81. Accordingly, an angler is required only to push-actuate the motor drive switch 59 again at the desired depth (of 120 meters, for example) while looking at the display.

When the motor drive switch 59 is operated like this, the clutch motor 47 rotates in direction of arrow D to instruct the controller 67 accordingly as shown in FIG. 2. Consequently the clutch operating plate 37 moves in direction of arrow B to turn on the clutch, thus switching the spool 7 to the fishing line winding mode. When the lead switch 63 is turned on by the magnet 61, the control 67 instructs the clutch motor 47 stop operating on receiving a signal to that effect.

The angler waits for a bite in the condition noted above. When there is a bite, the angler is to return the adjusting lever 83 to the motor output position of 0% once with the thumb and index finger of his right hand as shown by a double-dotted chain line of FIG. 1 while holding both sides of the reel body 1 with his both hands, whereby the spool motor 17 rotates at the output of the motor corresponding to the quantity of displacement of the lever 83 so as to wind up the fishing line 9.

While monitoring the display 87, the angler would turns the adjusting lever 83 so as to set the bar on the quantity graduations of the display 87 at "20" if he wants to wind up the fishing line 9 slowly and to set the bar on the quantity graduations thereof at "80" when a snell is strong enough to withstand a powerful tug. In other words, the fishing line 9 may be wound up at an optimum motor speed if the output of the motor 17 is controlled while the adjusting lever 83 is turned in order to meet winding-up requirements. When the winding-up operation is stopped, the adjusting lever 83 should be turned back to set the bar on the quantity graduations at "0".

If the angler wants to continue fishing, he would turn off the clutch by push-actuating the motor drive switch 59 again to let off the fishing line 9 and repeat the same procedure as what has been described until now.

If otherwise the manual handle 23 is turned in the winding-up direction (in direction of arrow F of FIG. 2) without the use of the adjusting lever 83, the rotation of the manual handle 23 will be transmitted via the drive gear 29 to the spool 7 and the fishing line 9 will be wound up on the spool 7. The operation of the manual handle 23 in the winding-up direction in combination with that of adjusting lever 83 in the direction in which the output of the motor is increased allows the fishing line 9 to be wound up on the spool 7.

According to the present embodiment, the fine adjustment of rotational speed of the spool motor 17 by means of the adjusting lever 83 is possible. Therefore, the fishing line 9 with a catch can be wound up at an optimum motor speed in conformity with the sea water condition. Since the adjusting lever 83 is arranged on the right-hand side of the reel body 1, moreover, it is possible for the angler to adjust the output of the motor by turning the adjusting lever 83 without shifting his right hand while holding both sides of the reel body 1. In addition, the adjusting lever 83 may be arranged on the left-hand side of the reel body 1 so that an angler can manipulate the adjusting lever 83 with his left land grasping the left-hand side of the reel body 1.

Figure 7:
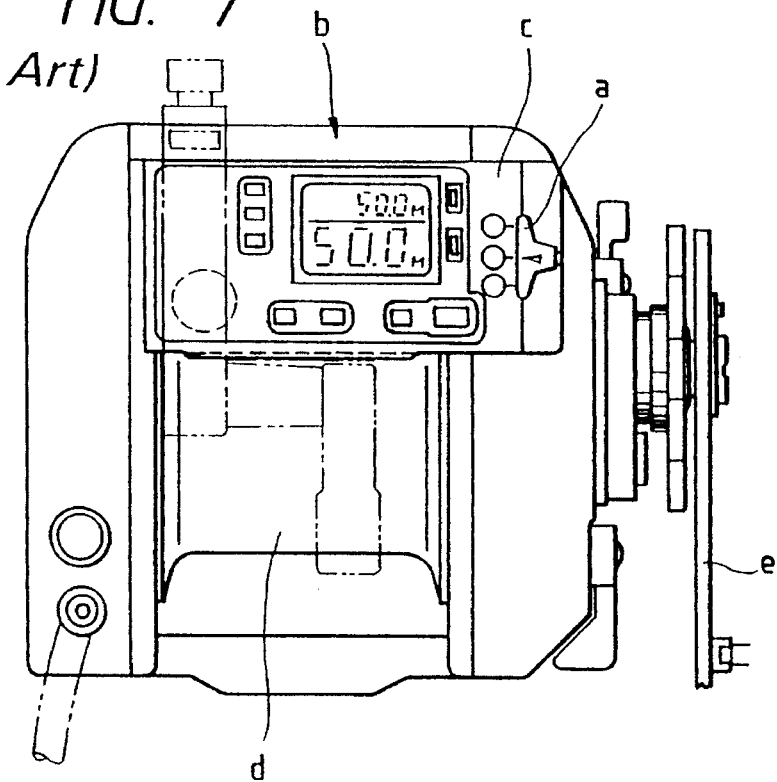
FIG. 7 is a top view of a conventional motor-operated fishing reel.

Therefore, the motor-operated fishing reel according to the present embodiment has proved to be superior in operability to the prior art motor-operated fishing reel shown in FIG. 7. Moreover, the provision of the manual handle 23 on the right-hand side of the reel body 1 as well as the setting of the direction in which the output of the motor is increased by the adjusting lever 83 equal to the direction in which the fishing line is wound up by the manual handle 23 facilitates the combination of the winding-up and speed-change operations respectively by means of the manual handle 23 and the adjusting lever 83. As a result, winding-up operability has been improved greatly.

Although the potentiometer 85 has been used to adjust the output of the motor according to the present invention, a lead switch, a volume switch, a Hall element or the like may be employed instead so as to make variable the winding-up speed of the spool 7.

With the respect to the method of measuring the length of the fishing line 9 to be drawn out and wound up, it is needless to say feasible to use a means, in place of the encoder 79, for measuring the length of a fishing line by detecting the rotation of a rotary body (such as a gear interlocked with the spool, and a roller pressed against the surface of a fishing line being wound) which is rotated as the fishing line 9 is drawn out.

As set forth above, the fishing line can be wound up at the most suitable motor speed corresponding to the sea water condition by operating the motor output regulator without the shifting of the hand positions while both sides of the reel body are firmly held as claimed in each claim of the present invention.

Moreover, the advantages of the present invention include the arrangement of the manual handle and the motor output regulator on the same side of the reel body wherein it facilitates the winding-up and speed-change operations in combination by means of the manual handle and the motor output regulator, and the setting of the direction in which the output of the motor is increased by the motor output regulator equal to the direction in which the fishing line is wound up by the manual handle wherein it further facilitates the combination of the winding-up and speed-change operations.

What is claimed is:

1. A motor-operated fishing reel comprising:
   a reel body having first and second side plates laterally spaced apart from each other, said first and second side plates defining first and second side surfaces, respectively, said side surfaces being oppositely positioned with respect to said reel body;
   a spool rotatably supported on said reel body and located between said first and second side plates, said spool rotating about a spool axis extending from said first side plate to said second side plate;

a motor for driving said spool to rotate at a predetermined rotational speed;

transmission means for transmitting rotation from the motor to said spool;

a manual handle rotatably supported on said first side plate for manually driving said spool to rotate, said manual handle projecting from said first side surface; and a motor regulator for varying said predetermined rotational speed, said regulator having a manipulation lever pivotally supported on said first side plate for selectively varying said predetermined rotational speed, said motor regulator is located at an upper front portion of said first side plate with respect to said spool axis, wherein said motor regulator is substantially disposed along said first side surface.

2. The motor-operated fishing reel as claimed in claim 1, wherein said predetermined rotational speed is increased when said manipulation lever is pivoted in a first rotary direction respective to said spool axis, and a fishline is wound onto said spool when said manual handle is rotated in said first rotary direction respective to said spool axis.

3. The motor-operated fishing reel as claimed in claim 1, further comprising:

a zero position;

wherein said motor is prevented from driving said spool unless said lever is located at said zero position designating a rotational speed of zero.

4. The motor-operated fishing reel as claimed in claim 3, wherein said predetermined rotational speed is increased in proportion to said pivotal movement of said lever from said zero position.

5. The motor operated fishing reel as claimed in claim 1, wherein said motor regulator projects from said first side surface, and pivots along a plane substantially parallel to said first side surface.

6. The motor operated fishing reel as claimed in claim 1, wherein said first side surface comprises a recessed portion receiving said motor regulator.

7. The motor operated fishing reel as claimed in claim 6, wherein said motor regulator pivots along a pivot plane located between said first side surface and a rotation plane defined by rotation of said manual handle.

8. A motor-operated fishing reel comprising:

a reel body having first and second side plates laterally spaced apart from each other, said first and second side plates defining first and second side surfaces, respectively, said side surfaces being oppositely positioned with respect to said reel body;

a spool rotatably supported on said reel body and located between said first and second side plates, said spool rotating about a spool axis extending from said first side plate to said second side plate;

a motor for driving said spool to rotate at a predetermined rotational speed;

transmission means for transmitting rotation from the motor to said spool;

a manual handle rotatably supported on said first side plate for manually driving said spool to rotate, said manual handle projecting from said first side surface; and a motor regulator for varying said predetermined rotational speed, said regulator having a manipulation lever pivotally supported on said first side plate for selectively varying said predetermined rotational speed, wherein said motor regulator pivots along a pivot plane located between said first side surface and a rotation plane defined by rotation of said manual handle.

* * * * *